US008093988B2

(12) United States Patent
Takene et al.

(10) Patent No.: US 8,093,988 B2
(45) Date of Patent: Jan. 10, 2012

(54) ENTRY CONTROL SYSTEM AND ENTRY CONTROL METHOD (75) Inventors: Kouichi Takene, Tokyo (JP); Kimito Idemori, Saitama (JP); Koichi Ikeda, Kanagawa (JP); Yoshiro Seki, Tokyo (JP); Fuminori Kishino, Tokyo (JP); Keiji Yamamoto, Tokyo (JP); Akira Sawada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1126 days.

(21) Appl. No.: 11/892,678

(22) Filed: Aug. 27, 2007

(65) Prior Publication Data
US 2008/0055041 A1 Mar. 6, 2008

(30) Foreign Application Priority Data

Aug. 29, 2006 (JP) ................ P2006-232407

(51) Int. Cl.
*B60R 25/00* (2006.01)
(52) U.S. Cl. .................... 340/5.7; 340/5.8; 340/5.64
(58) Field of Classification Search ............ 340/5.7, 340/5.61, 5.64, 5.63, 5.8
See application file for complete search history.

(56) References Cited

U.S. PATENT DOCUMENTS

| 4,788,542 | A | * | 11/1988 | Tanabe | 340/5.64 |
|---|---|---|---|---|---|
| 5,253,162 | A | * | 10/1993 | Hassett | 342/457 |
| 5,475,377 | A | * | 12/1995 | Lee | 340/5.9 |
| 5,541,585 | A | * | 7/1996 | Duhame et al. | 340/5.62 |
| 5,565,857 | A | * | 10/1996 | Lee | 340/5.42 |
| 5,936,544 | A | * | 8/1999 | Gonzales et al. | 340/5.22 |
| 6,720,861 | B1 | * | 4/2004 | Rodenbeck et al. | 340/5.64 |
| 6,944,318 | B1 | * | 9/2005 | Takata et al. | 382/115 |
| 7,050,608 | B2 | * | 5/2006 | Dobashi | 382/118 |
| 7,193,502 | B2 | * | 3/2007 | Vandrunen et al. | 340/5.71 |
| 7,450,015 | B2 | * | 11/2008 | Singer et al. | 340/573.4 |

(Continued)

FOREIGN PATENT DOCUMENTS

JP 9-137649 5/1997

(Continued)

OTHER PUBLICATIONS

Notifications of Reason(s) for Refusal issued by the Japanese Patent Office on Nov. 2, 2011, for Japanese Patent Application No. 2006-232407, and English-language translation thereof.

*Primary Examiner* — Daniel Wu
*Assistant Examiner* — Rufus Point
(74) *Attorney, Agent, or Firm* — Finnegan, Henderson, Farabow, Garrett & Dunner, L.L.P.

(57) ABSTRACT

To provide an entry control system as well as an entry control method allowing for an easy entry of user, permitting a restriction to persons who have a legitimate right to enter a facility, an illuminating device (1) emits a modulated visible light signal 13 modulated by use of a door ID code into a preset illumination range, the modulated visible light signal 13 from the illuminating device (1) is received by a mobile terminal (2) portable by the user, where it is demodulated for wireless signal transmission, and the door ID code transmitted from the mobile terminal (2) is received by an authentication device (3), which judges whether or not the door ID code is legitimate, and generates an unlock command when the door ID code is judged to be legitimate, and a door (4) for a facility controlled of entry receives the unlock command from the authentication device (3), whereby it is unlocked.

10 Claims, 9 Drawing Sheets

U.S. PATENT DOCUMENTS

| | | | |
|---|---|---|---|
| 7,557,690 B2 * | 7/2009 | McMahon | 340/426.13 |
| 7,796,013 B2 * | 9/2010 | Murakami et al. | 340/5.82 |
| 2003/0024754 A1 * | 2/2003 | Konno et al. | 180/287 |
| 2004/0229569 A1 * | 11/2004 | Franz | 455/66.1 |
| 2008/0055041 A1 * | 3/2008 | Takene et al. | 340/5.7 |

FOREIGN PATENT DOCUMENTS

| | | |
|---|---|---|
| JP | 2001-283171 | 10/2001 |
| JP | 2005-36627 | 2/2005 |
| JP | 2006-139689 | 6/2006 |
| JP | 2006-219830 | 8/2006 |

* cited by examiner

FIG. 10

ENTRY CONTROL SYSTEM AND ENTRY CONTROL METHOD

CROSS REFERENCE TO RELATED APPLICATION

The present application claims the benefit of priority under 35 U.S.C. §119 to Japanese Patent Application No. 2006-232407, filed on Aug. 29, 2006, the entire contents of which are incorporated herein by reference.

BACKGROUND OF THE INVENTION

1. Field of Art

The present invention relates to an entry control system and an entry control method using visible-light communications for entry control of a facility.

2. Description of Relevant Art

As an entry control system for a facility, such as a building or condominium, of which the entry is limited to specific persons, there is a conventional system employing a card key in which an ID code is stored.

This entry control system includes a card reader for reading an ID code stored in a key, such as a contact card using a magnetic effect or a non-contact card using an RFID (radio frequency identification), and a door lock to be unlocked when the read ID code is legitimate.

Techniques employing such a system have been disclosed in a patent document 1 (Japanese Patent Application Laid-Open Publication No. 2005-036627), and in a patent document 2 (Japanese Patent Application Laid-Open Publication No. 2001-283171).

The patent document 1 has disclosed techniques of an entry control system covering a plurality of doors to be controlled, permitting, even in occurrence of a failure in part of the system, the range of influence to be minimized by a partial degenerated operation, allowing for a suppressed reduction in level of security.

The patent document 2 has disclosed an RFID tag device for preventing an unauthorized use of a lost or stolen key.

Those techniques can be applied to the entry to a facility, allowing for an enhanced security.

However, in application of the patent document 1 and the patent document 2, it is necessary for the user to have actions to make a card reader read a card, and wait in front of a door after an ID code has been read by the card reader, till an unlock following authentication, as a problem.

As a solution thereto, a patent document 3 (Japanese Patent Application Laid-Open Publication No. H09-137649) has disclosed an entry control system, which has a radio wave dispersed from a data reading device installed at a door end to a data communication device portable by the user, and in which a stored data in the data communication device is transmitted by the radio wave to the data reading device, where it is received and processed for analysis to thereby control a door to be locked or unlocked.

Application of this technique allows a door to be unlocked, without needing actions of a user to have a card read nor waiting in front of the door.

Further, for techniques of the patent document 3 employing wireless communications using an electric wave that can be transmitted even into a place across a wall, there is a risk of interception of or obstruction to the electric wave by a malicious third person, but the user or administrator of entry control system is unable to recognize such an interception or obstruction, as a problem.

Further, for wireless communications using an electric wave, restriction of transmission range is difficult, and there may occur a cross-talk, as another problem.

SUMMARY OF THE INVENTION

It therefore is an object of the present invention to provide an entry control system and an entry control method allowing for an easy entry of user, permitting a restriction to persons who have a legitimate right to enter a facility To achieve the object described, according to an aspect of the present invention, an entry control system comprises an illuminating device configured to illuminate a preset illumination range; a mobile terminal configured to be portable by a user; an authentication device; and a door provided for a facility controlled of entry, the illuminating device comprising a door ID code memory configured to store therein a door ID code assigned to the door as a unique ID code for use to unlock the door; a modulator configured to generate a light modulation signal by using the door ID code stored in the door ID code memory; and a light-emitting device configured to be switched ON/OFF to emit a modulated visible light signal modulated by the light modulation signal generated by the modulator, into the illumination range, the mobile terminal comprising a light-receiving device configured to receive the modulated visible light signal from the light-emitting device; a demodulator configured to demodulate the modulated visible light signal received by the light-receiving device to the door ID code; and a wireless signal transmitter configured to transmit the door ID code demodulated by the demodulator to the authentication device by use of wireless communication, the authentication device comprising a wireless signal receiver configured to receive the door ID code transmitted from the wireless signal transmitter; an authentication processor configured for an authentication process to judge whether the received door ID code is legitimate or not; and an electronic key controller connected to the door, and adapted, when the received door ID code is judged to be legitimate in the authentication process at the authentication processor, to generate, and send to the door, an unlock command, and the door comprising an electronic key configured to unlock with the unlock command received from the electronic key controller.

Further, according to another aspect of the present invention, an entry control method comprises a door ID code storing step of storing, at a an illuminating device configured to illuminate a preset illumination range, storing a door ID code assigned to a door for a facility controlled of entry, as a unique ID code for use to unlock the door; a light modulation signal generating step of generating, at the illuminating device, a light modulation signal by using the door ID code stored at the door ID code storing step; a modulated visible light signal emitting step of switching, at the illuminating device, a light-emitting device thereof by using the light modulation signal generated by the light modulation signal generating step to emit a modulated visible light signal, into the illumination range; a modulated visible light signal receiving step of receiving, at a mobile terminal configured to be portable by a user, the modulated visible light signal emitted at the modulated visible light signal emitting step; a modulated visible light signal demodulating step of demodulating, at the mobile terminal, the modulated visible light signal received at the modulated visible light signal receiving step to the door ID code; a door ID code transmitting step of transmitting, at the mobile terminal, the door ID code demodulated at the modulated visible light signal demodulating step to an authentication device, by use of wireless communication; a door ID code receiving step of receiving, at the authentication device, the door ID code transmitted at the door ID code transmitting step; a door ID code judging step of judging, at the authentication device, whether or not the door ID code received at the door ID code receiving step is legitimate; an unlock command sending step of generating and sending to the door, at the authentication device, an unlock command when the door ID code received at the door ID code receiving step is judged to be legitimate; and an unlocking step of unlocking, at the door, an electronic key, when the unlock command sent at the unlock command sending step is received.

The entry control system as well as the entry control method according to the present invention allows for an easy entry of user, permitting a restriction to persons who have a legitimate right to enter a facility.

DETAILED DESCRIPTION OF THE EMBODIMENTS

There will be described best modes of embodiment for carrying out the invention with reference to the accompanying drawings. Like members or elements are designated by like reference characters to eliminate redundancy.

First Embodiment (Configuration of Entry Control System According to the First Embodiment)

Figure 1:
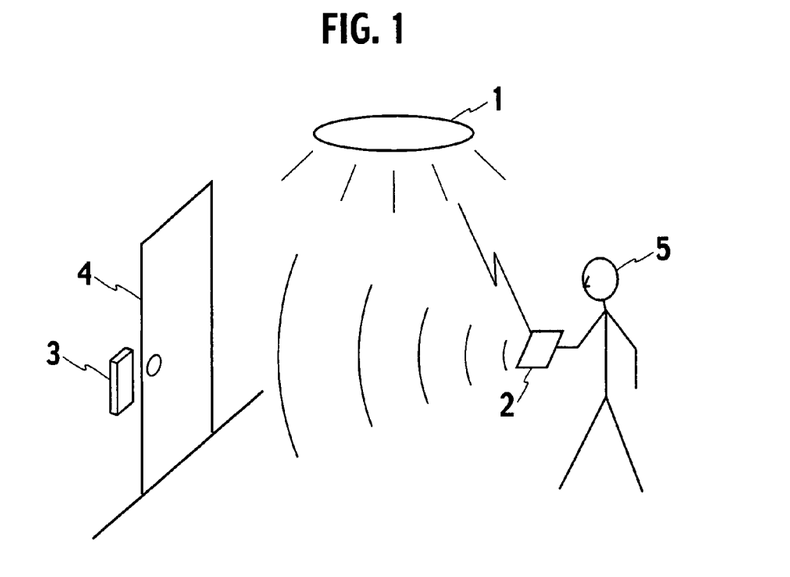
FIG. 1 shows an appearance of an entirety of an entry control system according to any one of a first, a second, a third, a fourth, and a fifth embodiment of the present invention.
Figure 2:
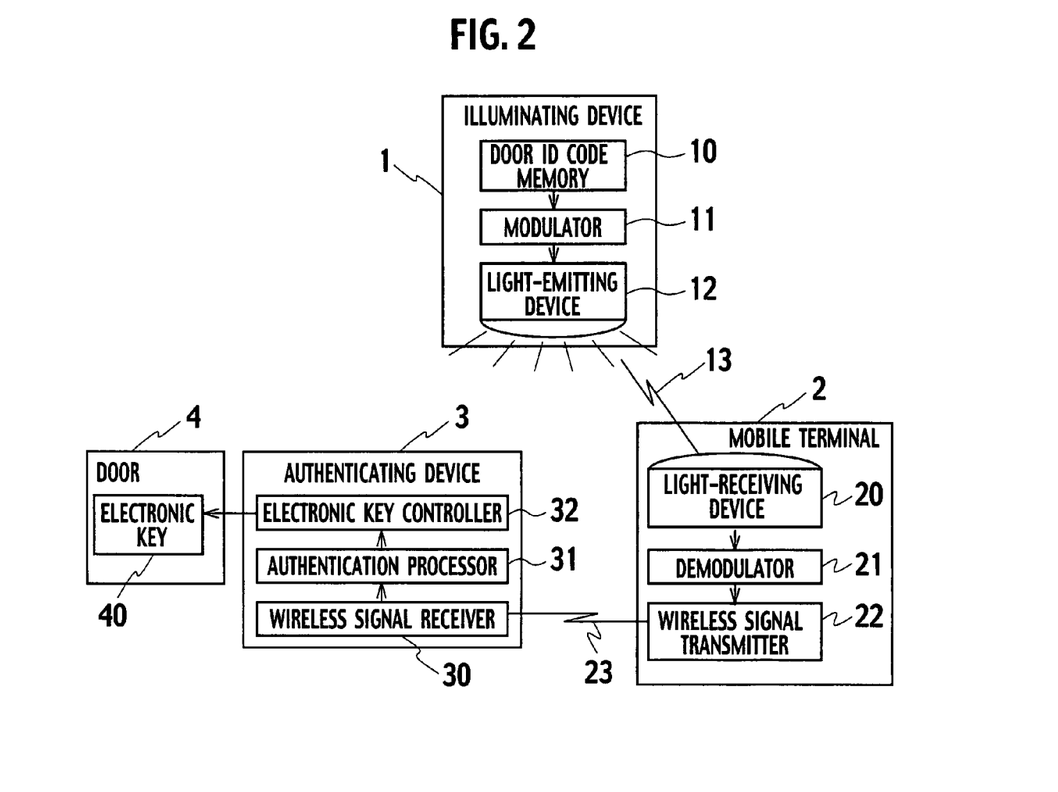
FIG. 2 is a block diagram of an entry control system according to the first embodiment of the present invention.

As shown in FIG. 1 and FIG. 2, the entry control system according to the present embodiment includes an illuminating device 1, a mobile terminal 2 portable by the user 5, an authentication device 3, and a door 4 for entry into a facility controlled of entry.

The illuminating device 1 has a door ID code memory 10, a modulator 11, and a light-emitting device 12.

The door ID code memory 10 stores therein a door ID code assigned to the door 4 as a unique ID code for unlocking the door 4.

The modulator 11 generates a light modulation signal by using the door ID code stored in the door ID code memory 10.

The light-emitting device 12 is made up by a visible-light emitting element (e.g. LED: light emitting diode) configured to be switched ON/OFF for emission of a modulated visible light signal 13 that is modulated by the light modulation signal generated by the modulator 11 into an illumination range of the illuminating device 1. A switching speed is set that is impossible for the human eyes to recognize.

The mobile terminal 2 has a light-receiving device 20, a demodulator 21, and a wireless signal transmitter 22.

The light-receiving device 20 receives the modulated visible light signal 13 emitted from the light-emitting device 12.

The demodulator 21 is configured to demodulate the modulated visible light signal 13 received by the light-receiving device 20 to a door ID code, and is installed simply in the mobile terminal 2 to be carried by a user who is given an entry permission.

The wireless signal transmitter 22 transmits the door ID code demodulated by the demodulator 21 to the authentication device 3, by way of wireless communication 23 using electric waves, visible light, infrared ray, or the like.

The authentication device 3 has a wireless signal receiver 30, an authentication processor 31, and an electronic key controller 32.

The wireless signal receiver 30 receives the door ID code transmitted from the wireless signal transmitter 22 of the mobile terminal 2.

The authentication processor 31 is configured for an authentication process to judge whether the received door ID code is legitimate or not.

The electronic key controller 32 is connected to the door 4, and is adapted, when the received door ID code is judged to be legitimate in the authentication process at the authentication processor 31, to generate, and send to the door 4, an unlock command for unlocking a later-described electronic key 40 in the door 4.

The door 4 has the electronic key 40, which is configured to lock and unlock the door 4 in accordance with the command received from the electronic key controller 32.

(Actions of Entry Control System According to the First Embodiment)

Figure 3:
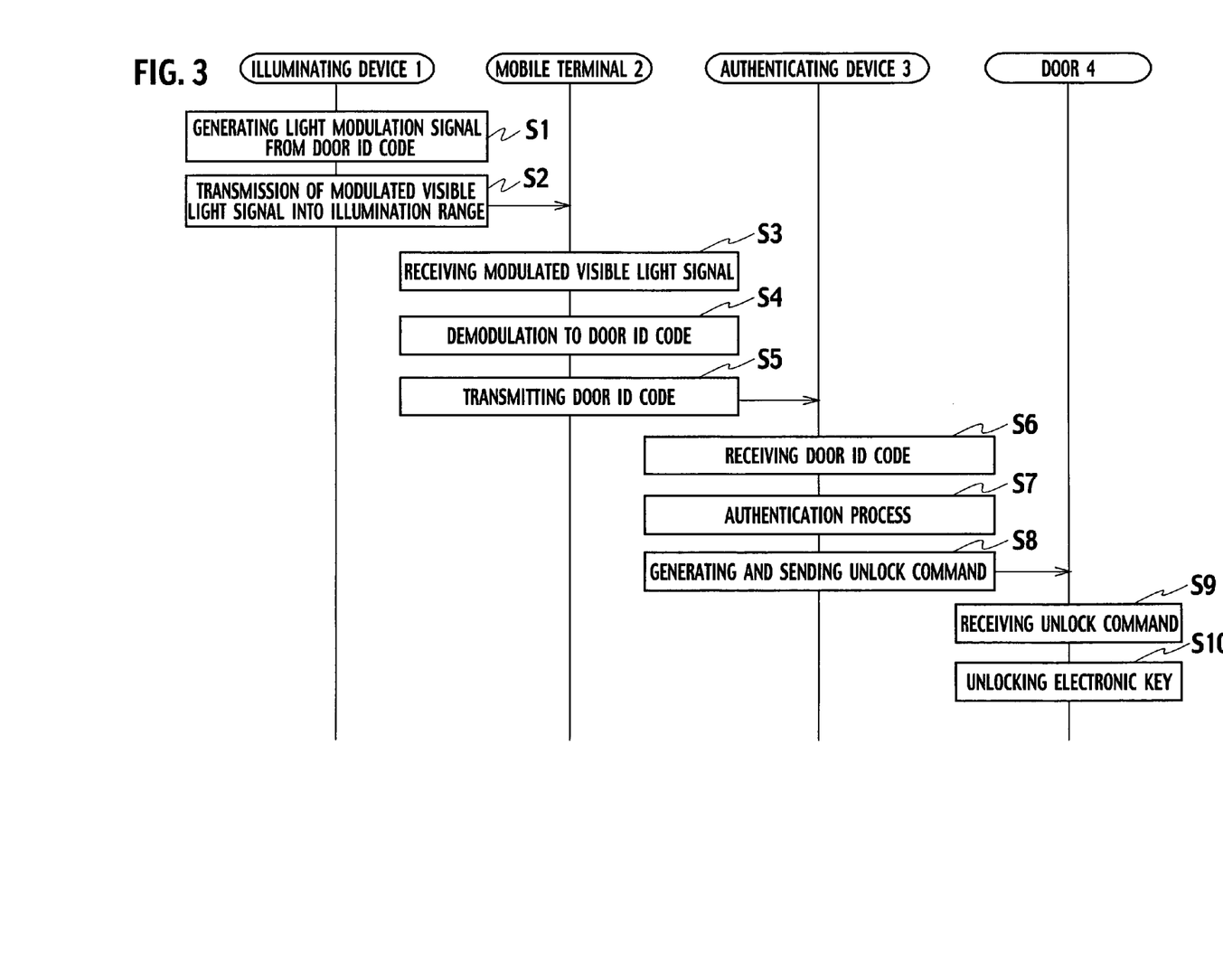
FIG. 3 shows, in a sequence chart, actions of the entry control system according to the first embodiment, as well as those of an entry control system according to the fifth embodiment of the present invention.

In the sequence chart of FIG. 3, first at a step S1, a unique door ID code that has been assigned to the door 4 for use to unlock the door 4 and stored in the door ID code memory 10 is acquired by the modulator 11 in the illuminating device 1, where it is processed to generate a light modulation signal.

At a step S2, a modulated visible light signal 13 is generated and emitted from the light-emitting device 12 by switching the light-emitting device ON/OFF according to the light modulation signal, into an illumination range of the illuminating device 1.

At a step S3, under the condition of the modulated visible light signal 13 being emitted, a user 5 who is carrying the mobile terminal 2 enters the illumination range of the illuminating device 1, when the modulated visible light signal 13 is received by the light-receiving device 20 of the mobile terminal 2.

At a step S4, as the modulated visible light signal 13 is received by the light-receiving device 20, it is demodulated to a door ID code by the demodulator 21, and at a step S5, the door ID code is transmitted from the wireless signal transmitter 22 to the authentication device 3, by use of wireless communication 23.

At a step S6, in the authentication device 3, the wireless signal receiver 30 receives the door ID code transmitted from the wireless signal transmitter 22 of the mobile terminal 2, and at a step S7, the authentication processor 31 performs authentication to judge whether this door ID code is legitimate or not.

At a step S8, as the demodulated door ID code is judged to be a legitimate door ID code after the authentication, the electronic key controller 32 generates, and sends to the door 4, an unlock command for unlocking the electronic key 40 in the door 4.

At a step S9, at the door 4, the unlock command from the electronic key controller 32 is received, and at a step S10, the electronic key 40 is unlocked in dependence on the unlock command.

Unless the door ID code is judged to be legitimate at the step S7, then no unlock command is generated, and the electronic key 40 of the door 4 will not be unlocked.

As will be seen from the foregoing description, the first embodiment permits only a user who has a legitimate right to enter the facility and therefore carries a mobile terminal with him/her, allowing for an easy unlocking of the electronic key by the legitimate user without needing any action nor waiting for the unlocking.

Second Embodiment (Configuration of Entry Control System According to the Second Embodiment)

Figure 4:
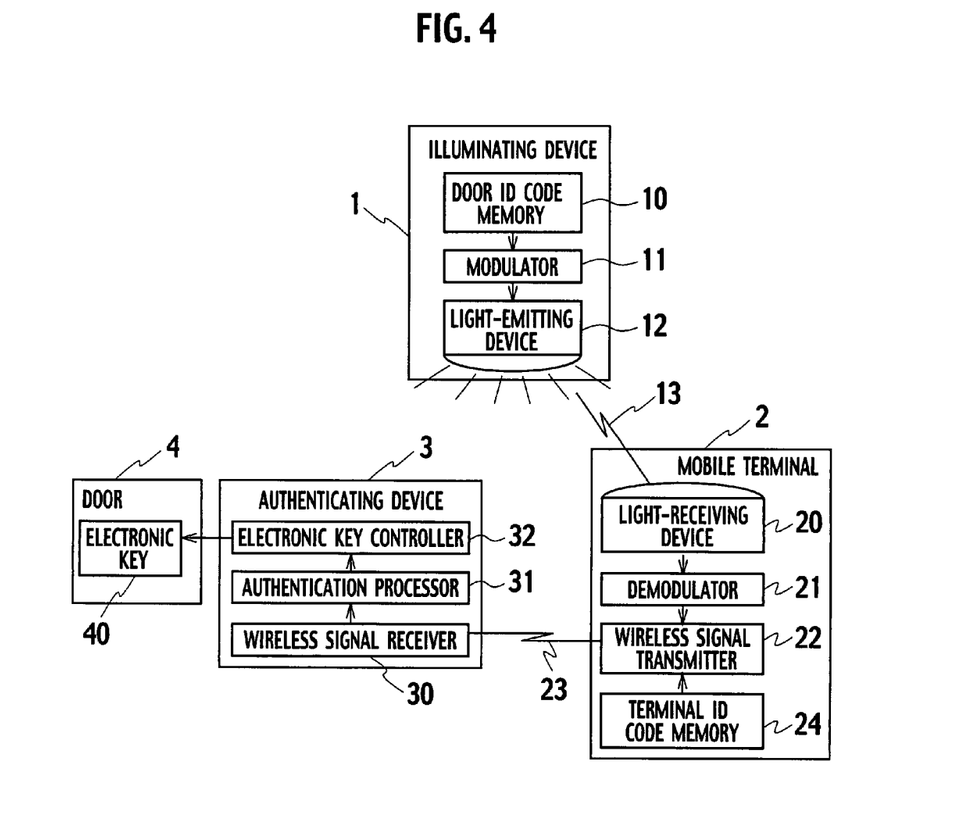
FIG. 4 is a block diagram of an entry control system according to the second embodiment of the present invention.

As shown in FIG. 4, the entry control system according to the present embodiment includes an illuminating device 1, a mobile terminal 2 portable by the user 5, an authentication device 3, and a door 4 for entry into a facility.

The entry control system according to the present embodiment is identical to the first embodiment, except for the mobile terminal 2 having a terminal ID code memory 24, and redundant description is eliminated.

The terminal ID code memory 24 stores therein a terminal ID code assigned as unique information to the mobile terminal 2.

The mobile terminal 2 has a wireless signal transmitter 22, which acquires the terminal ID code from the terminal ID code memory 24, as well as a door ID code demodulated by a demodulator 21, and transmits them to the authentication device 3, using wireless communication 23.

The authentication device 3 has a wireless signal receiver 30, which receives the door ID code and terminal ID code transmitted from the wireless signal transmitter 22 of the mobile terminal 2.

The authentication device 3 has an authentication processor 31, which is configured for authentication to judge whether the door ID code and terminal ID code received by the wireless signal receiver 30 are legitimate or not.

(Actions of Entry Control System According to the Second Embodiment)

Figure 5:
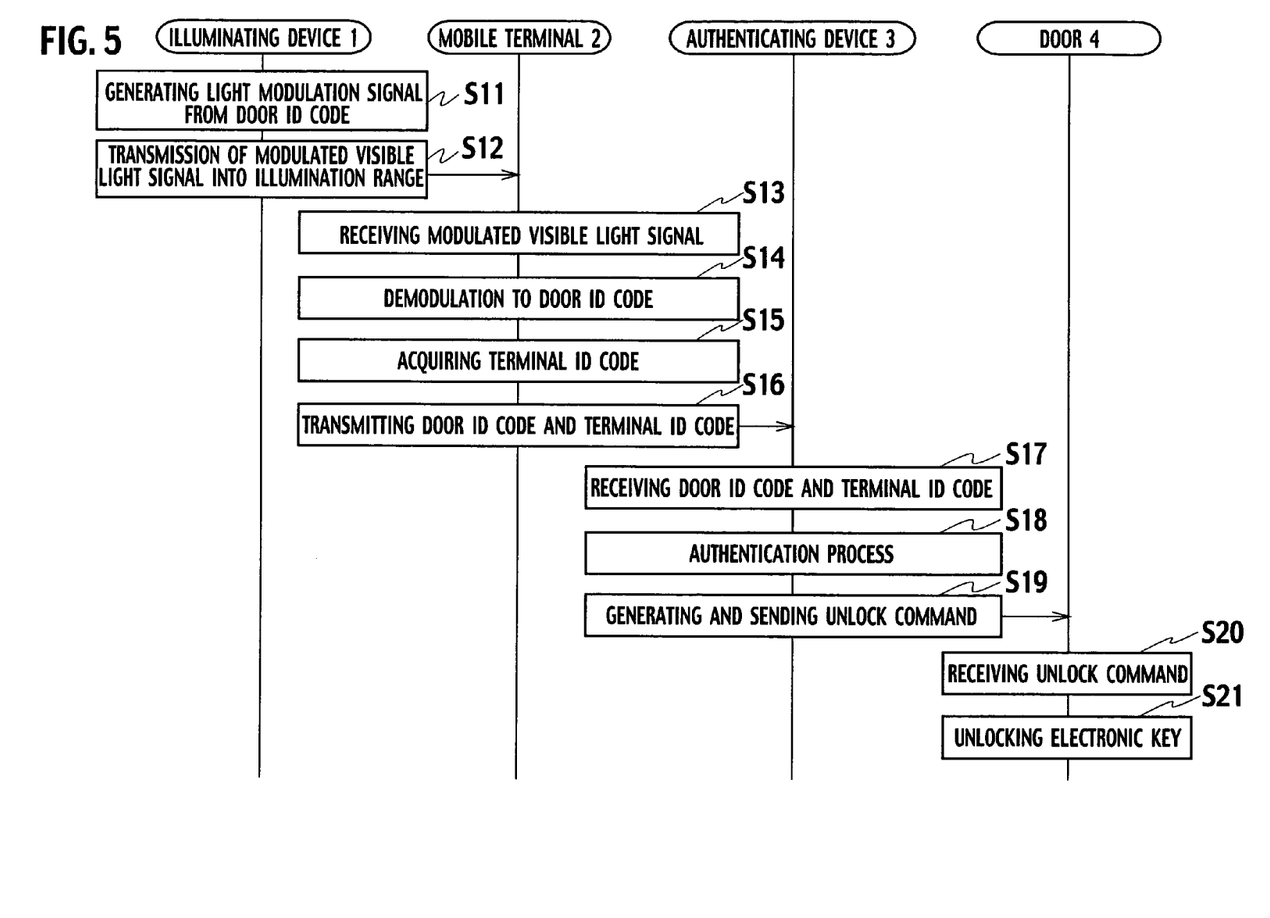
FIG. 5 is a sequence chart of actions of the entry control system according to the second embodiment of the present invention.

In FIG. 5, steps S11 to S14 are identical to the steps S1 to S4 in FIG. 3 of the first embodiment, and redundant description is eliminated.

At the step S14, a modulated visible light signal 13 received at the mobile terminal 2 is demodulated to a door ID code, and at a step S15, the wireless signal transmitter 22 acquires this door ID code and the terminal ID code in the terminal ID code memory 24, which are transmitted at a step S16 to the authentication device 3, by use of wireless communication 23.

At a step S17, in the authentication device 3, the wireless signal receiver 30 receives the door ID code and terminal ID code transmitted from the wireless signal transmitter 22 of the mobile terminal 2, and at a step S18, the authentication processor 31 performs authentication to judge whether the door ID code and terminal ID code are legitimate or not.

In FIG. 5, steps S19 to S21 are identical to the steps S8 to S10 in FIG. 3 of the first embodiment, and redundant description is eliminated.

As will be seen from the foregoing description, the second embodiment gives like effects to the first embodiment, permitting an individual authentication in authentication process for each terminal, allowing for the more enhanced security level in entry control.

Third Embodiment (Configuration of Entry Control System According to the Third Embodiment)

Figure 6:
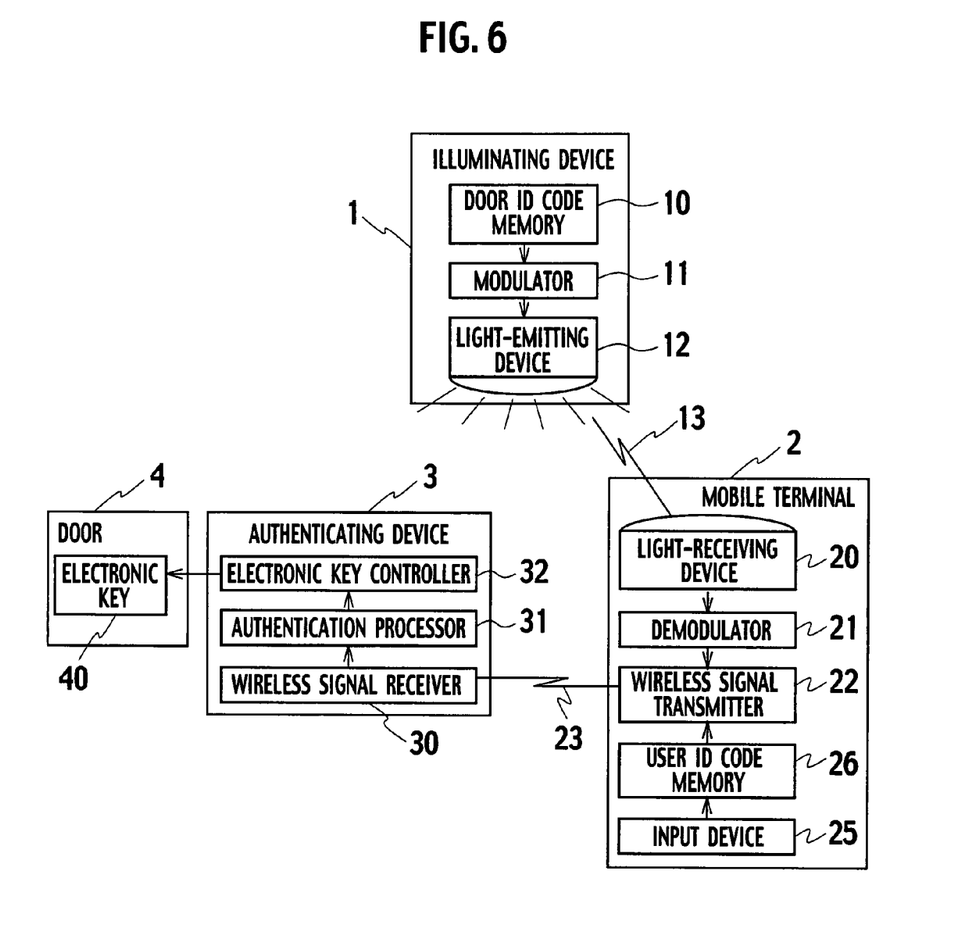
FIG. 6 is a block diagram of an entry control system according to the third embodiment of the present invention.

As shown in FIG. 6, the entry control system according to the present embodiment includes an illuminating device 1, a mobile terminal 2, an authentication device 3, and a door 4 for entry into a facility.

The entry control system according to the present embodiment is identical to the first embodiment, except for the mobile terminal 2 having an input device 25 and a user ID code memory 26, and redundant description is eliminated.

The input device 25 is configured for operation by the user 5 to input a user ID code (e.g. PIN: personal identification number) for user identification.

The user ID code memory 26 stores therein the user ID code input by the input device 25.

(Actions of Entry Control System According to the Third Embodiment)

Figure 7:
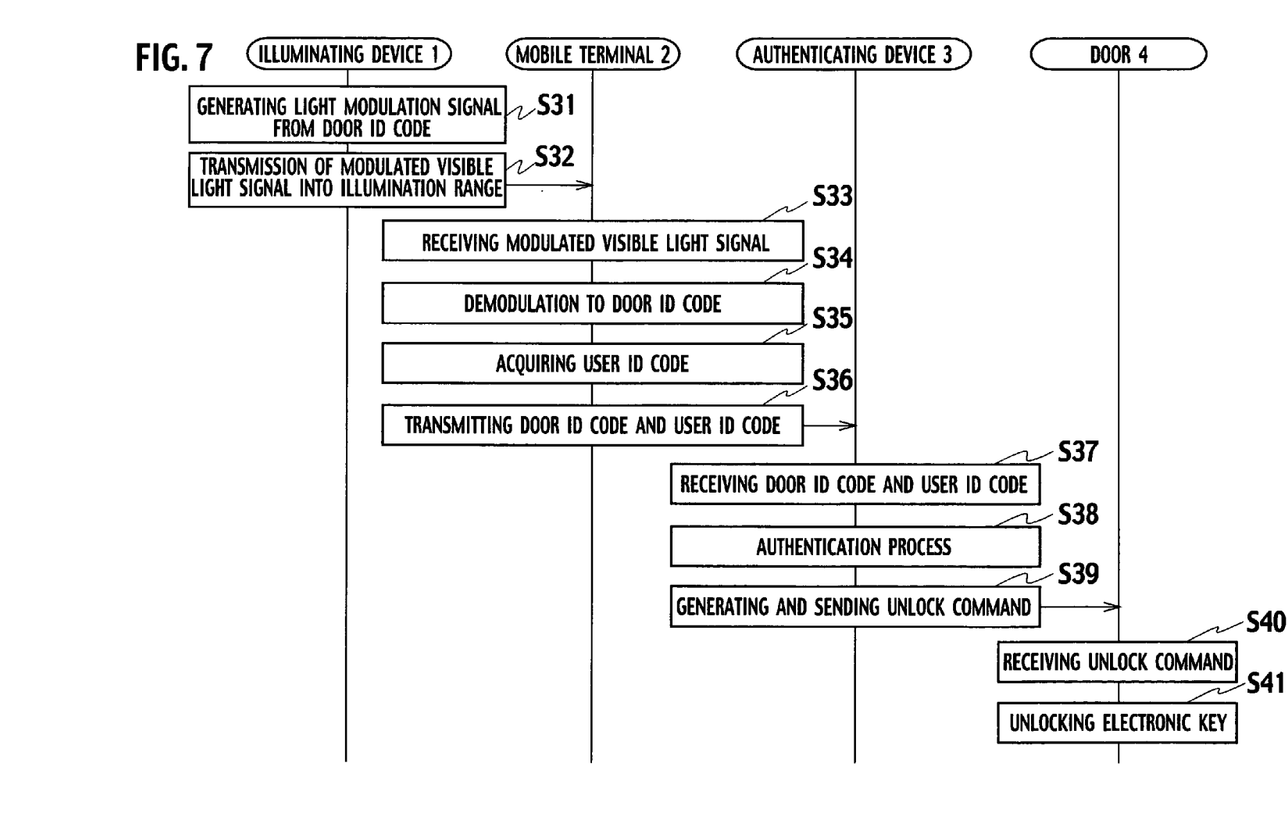
FIG. 7 is a sequence chart of actions of the entry control system according to the third embodiment of the present invention.

In FIG. 7, steps S31 to S34 are identical to the steps S1 to S4 in FIG. 3 of the first embodiment, and redundant description is eliminated.

At the step S34, a modulated visible light signal 13 received at the mobile terminal 2 is demodulated to a door ID code, and at a step S35, a wireless signal transmitter 22 acquires this door ID code and the user ID code in the user ID code memory 26, which are transmitted at a step S36 to the authentication device 3, by use of wireless communication 23.

At a step S37, in the authentication device 3, a wireless signal receiver 30 receives the door ID code and user ID code transmitted from the wireless signal transmitter 22 of the mobile terminal 2, and at a step S38, an authentication processor 31 performs authentication to judge whether the door ID code and user ID code are legitimate or not.

In FIG. 7, steps S39 to S41 are identical to the steps S8 to S10 in FIG. 3 of the first embodiment, and redundant description is eliminated.

As will be seen from the foregoing description, the third embodiment gives like effects to the first embodiment, permitting an individual authentication in authentication process for each user, allowing for the more enhanced security level in entry control.

The user ID cod stored in the user ID code memory 26 of the mobile terminal 2 may be set for an automatic deletion by lapse of a constant time (e.g. 24 hours), to thereby eliminate the necessity of a relationship of one-to-one correspondence between the terminal 2 and the user, while allowing for prevention of an unauthorized access such as by a stolen terminal.

Although the present embodiment employs a user ID code as information for user identification, the present invention is not restricted thereto, and may employ biometrics or the like as information therefor.

Fourth Embodiment

Configuration of Entry Control System According to the Fourth Embodiment

Figure 8:
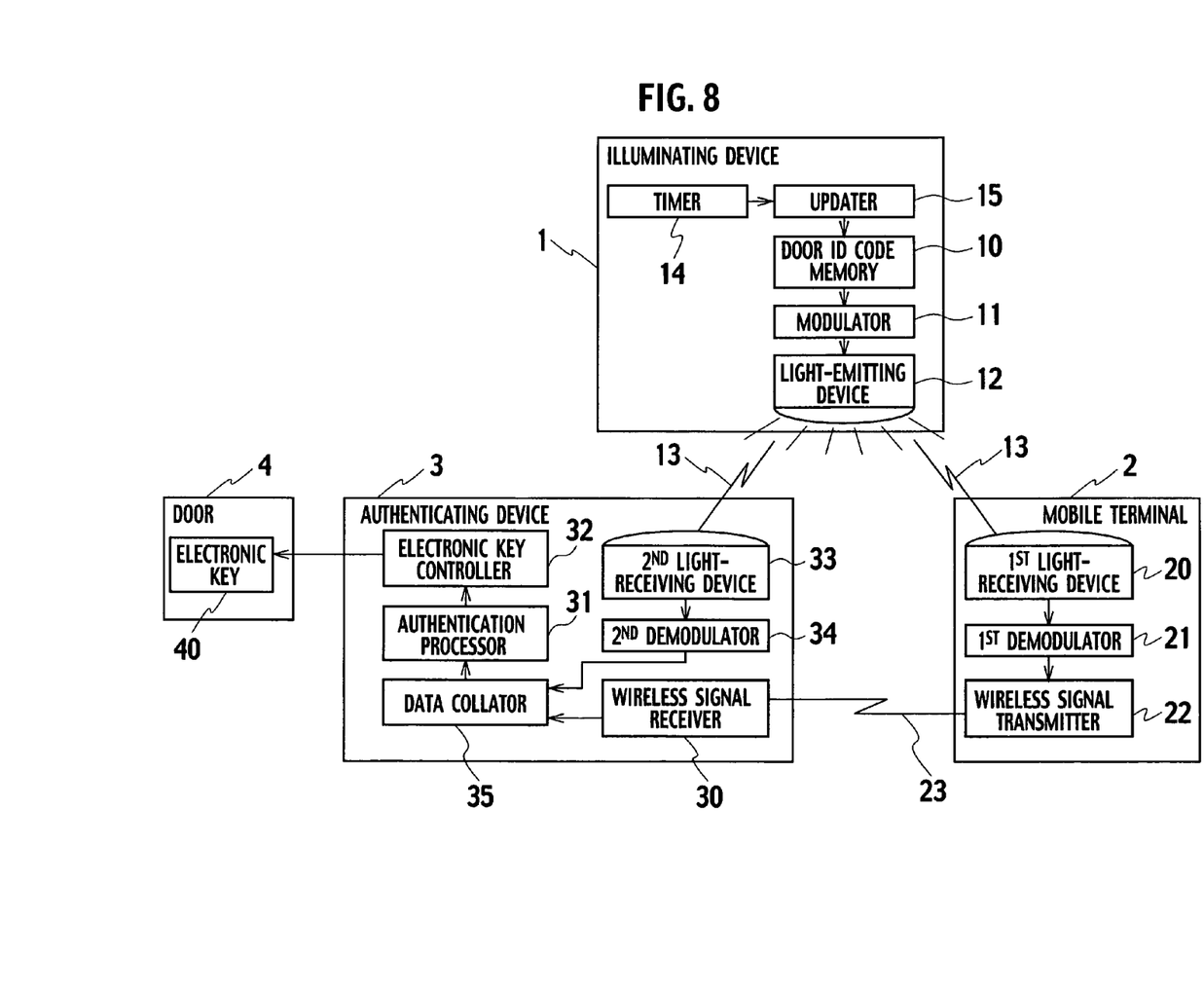
FIG. 8 is a block diagram of an entry control system according to the fourth embodiment of the present invention.

As shown in FIG. 8, the entry control system according to the present embodiment includes an illuminating device 1, a mobile terminal 2, an authentication device 3, and a door 4 for entry into a facility.

The illuminating device 1 has a door ID code memory 10, a modulator 11, a light-emitting device 12, a timer 14, and an updater 15.

The door ID code memory 10, modulator 11, and light-emitting device 12 are identical to the first embodiment, and redundant description is eliminated.

The timer 14 is configured for a measurement of time to determine a timing for the updater 15 to update a later-described door ID code.

The updater 15 is configured to update a door ID code stored in the door ID code memory 10 at intervals of a preset period, e.g. one minute, that depends on time measurement information of the timer 14.

The mobile terminal 2 has a first light-receiving device 20, a first demodulator 21, and a wireless signal transmitter 22. These are identical in configuration to the light-receiving device 20, the demodulator 21, and the wireless signal transmitter 22 of the first embodiment, and redundant description is eliminated.

The authentication device 3 has a wireless signal receiver 30, an authentication processor 31, an electronic key controller 32, a second light-receiving device 33, a second demodulator 34, and a data collator 35.

The wireless signal receiver 30, authentication processor 31, and electronic key controller 32 are identical to the first embodiment, and redundant description is eliminated.

The second light-receiving device 33 receives a modulated visible light signal 13 emitted from the light-emitting device 12.

The second demodulator 34 is configured to demodulate the modulated visible light signal 13 received by the second light-receiving device 33 to a door ID code.

The data collator 35 is configured for a collation to judge whether the door ID code demodulated by the second demodulator 34 is coincident with a door ID code received by the wireless signal receiver 30, and upon judgment of their coincidence, to output the coincident door ID code to the authentication processor 31.

(Actions of Entry Control System According to the Fourth Embodiment)

Figure 9:
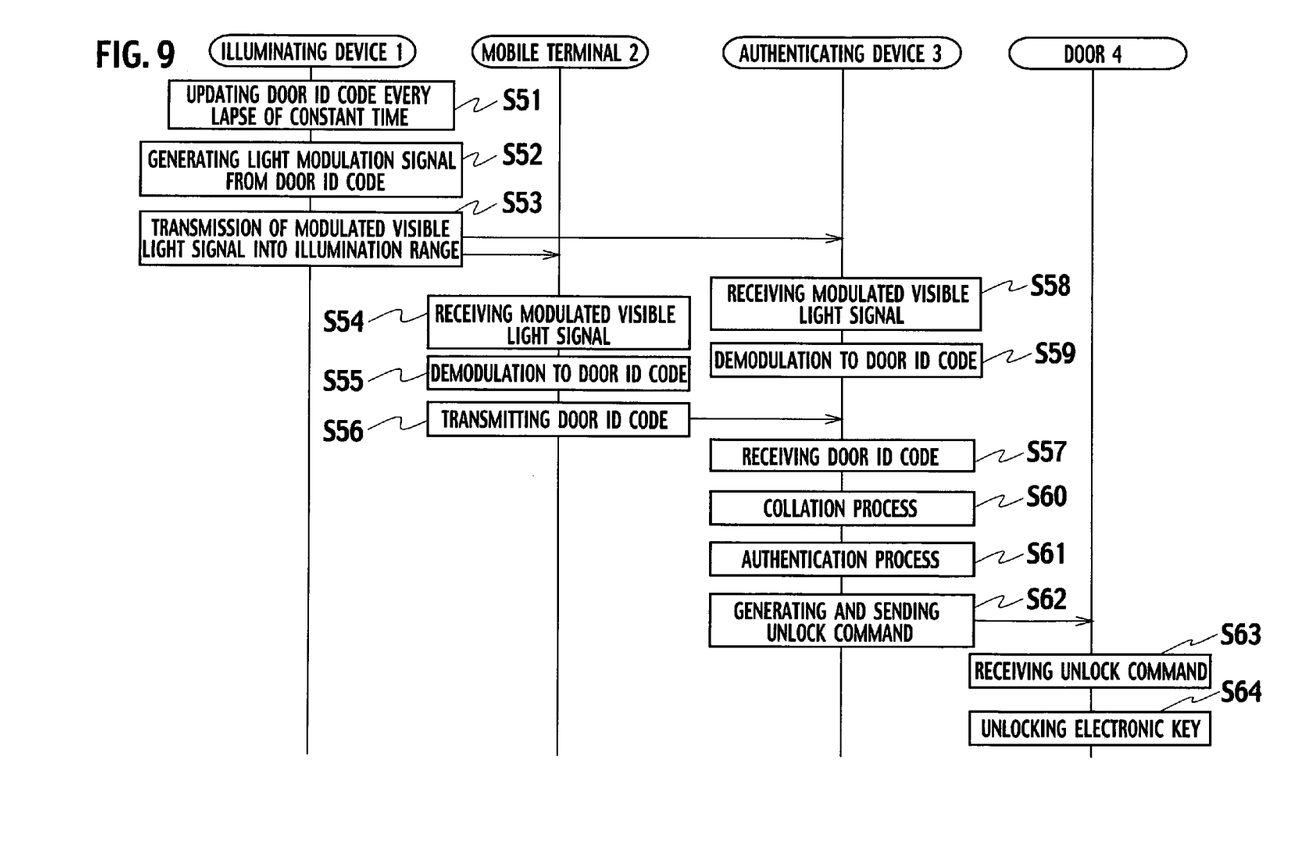
FIG. 9 is a sequence chart of actions of the entry control system according to the fourth embodiment of the present invention.

In the sequence chart of FIG. 9, first at a step S51, a unique door ID code that has been assigned to the door 4 and stored in the door ID code memory 10 is updated by the updater 15 at intervals of a preset period, e.g. one minute, depending on time measurement information of the timer 14.

Next, at a step S52, a door ID code periodically updated by the updater 15 is acquired by the modulator 11, where it is processed to generate a light modulation signal for modulating light emission from the light-emitting device.

At a step S53, the modulated visible light signal 13 is emitted from the light-emitting device 12, into an illumination range of the illuminating device 1 encompassing a place where the authentication device 3 is installed.

At a step S54, under the condition of the modulated visible light signal 13 being emitted in the illumination range of the illuminating device 1, a user 5 who is carrying the mobile terminal 2 enters the illumination range of the illuminating device 1, when the modulated visible light signal 13 is received by the first light-receiving device 20 of the mobile terminal 2.

At a step S55, as the modulated visible light signal 13 is received by the first light-receiving device 20, it is demodulated to a door ID code by the first demodulator 21, and at a step S56, the door ID code is transmitted from the wireless signal transmitter 22 to the authentication device 3, by use of wireless communication 23.

At a step S57, the door ID code transmitted from the wireless signal transmitter 22 is received by the wireless signal receiver 30 of the authentication device 3.

On the other hand, at a step S58, the modulated visible light signal 13 is received also by the second light-receiving device 33 of the authentication device 3, because the authentication device 3 also resides within the illumination range of the illuminating device 1.

At a step S59, as the modulated visible light signal 13 is received by the second light-receiving device 33, it is demodulated to a door ID code by the second demodulator 34.

Next, at a step S60, the data collator 35 collates the door ID code received by the wireless signal receiver 30 and the door ID code demodulated by the second demodulator 34, to judge whether or not they are coincident with each other.

At a step S61, as the door ID code received by the wireless signal receiver 30 and the door ID code demodulated by the second demodulator 34 are judged to be coincident with each other after the collation, the authentication processor 31 performs authentication to judge whether this door ID code is legitimate or not.

At a step S62, as the demodulated door ID code is judged to be a legitimate door ID code after the authentication, the electronic key controller 32 generates, and sends to the door 4, an unlock command for unlocking an electronic key 40 in the door 4.

At a step S63, at the door 4, the unlock command from the electronic key controller 32 is received, and at a step S64, the electronic key 40 is unlocked in dependence on the unlock command.

If the door ID code received by the wireless signal receiver 30 and the door ID code demodulated by the second demodulator 34 are not judged to be coincident with each other at the step S60, or if the door ID code is not judged to be legitimate at the step S61, then no unlock command is generated, and the electronic key 40 of the door 4 will not be unlocked.

As will be seen from the foregoing description, the fourth embodiment gives like effects to the first embodiment, while permitting the door ID code to be periodically updated, thereby allowing for the more enhanced security level in entry control.

Fifth Embodiment (Configuration of Entry Control System According to the Fifth Embodiment)

Figure 10:
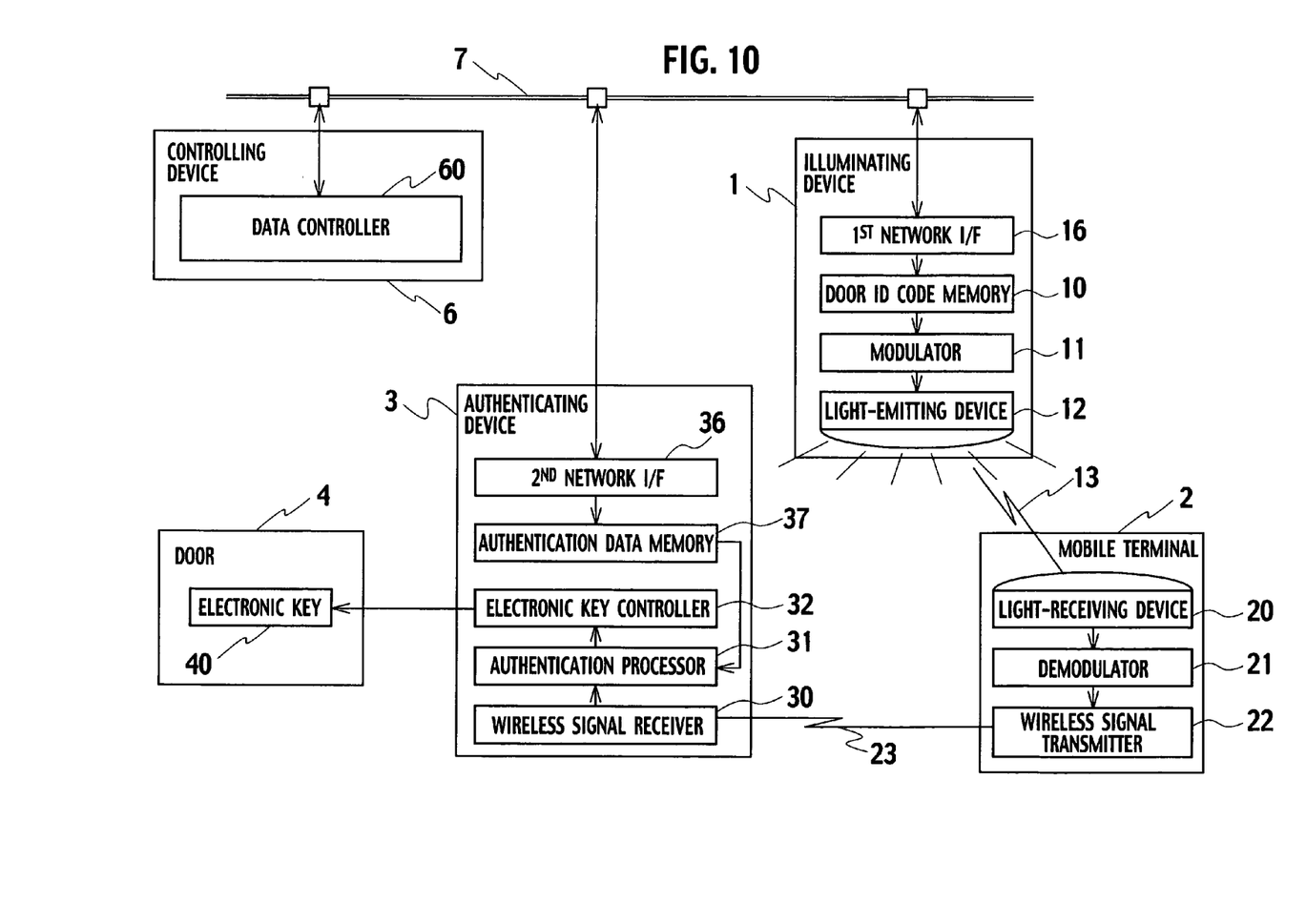
FIG. 10 is a block diagram of the entry control system according to the fifth embodiment of the present invention.

As shown in FIG. 10, the entry control system according to the present embodiment includes an illuminating device 1, a mobile terminal 2, an authentication device 3, a door 4 for entry into a facility, and a controlling device 6, while the illuminating device 1, the authentication device 3, and the controlling device 6 are linked with each other through a network 7.

The illuminating device 1 has a door ID code memory 10, a modulator 11, a light-emitting device 12, and a first network interface 16.

The door ID code memory 10, modulator 11, and light-emitting device 12 are identical to those of the same reference numbers of the first embodiment, and redundant description is eliminated.

The first network interface 16 is configured for transmission and reception of data to and from the controlling device 6 through the network 7.

The mobile terminal 2 is identical in configuration to the first embodiment, and redundant description is eliminated.

The authentication device 3 has a wireless signal receiver 30, an authentication processor 31, an electronic key controller 32, a second network interface 36, and an authentication data memory 37.

The wireless signal receiver 30, authentication processor 31, and electronic key controller 32 are identical to the first embodiment, and redundant description is eliminated.

The second network interface 36 is configured for transmission and reception of data to and from the controlling device 6 through the network 7.

The authentication data memory 37 stores therein authentication data for use in authentication of a legitimate door ID code at the authentication processor 31.

The controlling device 6 has a data controller 60 configured to transmit information for updating a door ID code to be stored in the door ID code memory 10 through the network 7 and the first network interface 16, and to transmit information for updating authentication data to be stored in the authentication data memory 37 through the network 7 and the second network interface 36.

(Actions of Entry Control System According to the Fifth Embodiment)

Process actions in the entry control system according to the present embodiment are identical to the first embodiment, and redundant description is eliminated.

According to the present embodiment, the data controller 60 in the controlling device 6 is configured to control a door ID code to be stored in the door ID code memory 10 of the illuminating device 1, and authentication data to be stored in the authentication data memory 37 of the authentication device 3, and to update them by an arbitrary timing or at intervals of a constant time, as necessary.

For the door ID code to be stored in the door ID code memory 10, the update is implemented by associated information transmitted from the data controller 60 through the network 7 and received by the first network interface 16.

For the authentication data to be stored in the authentication data memory 37, the update is implemented by associated information transmitted from the controlling device 6 through the network 7 and received by the second network interface 36.

It is possible to let resultant authentication data at the authentication processor 31 stored in the authentication data memory 37, and transmitted at intervals of a constant time through the second network interface 36 and the network 7 to the controlling device 6, to have authentication results logged in the controlling device 6.

As will be seen from the foregoing description, the fifth embodiment gives like effects to the first embodiment, while permitting the door ID code to be updated by an arbitrary timing or at intervals of a constant time, as necessary, thus allowing for the more enhanced security level in entry control.

While preferred embodiments of the present invention have been described using specific terms, such description is for illustrative purposes, and it is to be understood that changes and variations may be made without departing from the scope of the following claims.

What is claimed is:

1. An entry control system comprising:
an illuminating device configured to illuminate a preset illumination range;
a mobile terminal configured to be portable by a user;
an authentication device; and
a door provided for a facility controlled of entry, wherein
the illuminating device comprising:
a door ID code memory configured to store therein a door ID code assigned to the door as a unique ID code for use to unlock the door;
a modulator configured to generate a light modulation signal by using the door ID code stored in the door ID code memory; and
a light-emitting device configured to switch ON/OFF thereof to emit a modulated visible light signal modulated by the light modulation signal generated by the modulator, into the illumination range,
the mobile terminal comprising:
a light-receiving device configured to receive, when the terminal enters into the illumination range, the modulated visible light signal being emitted from the light-emitting device;
a demodulator configured to demodulate the modulated visible light signal received by the light-receiving device to the door ID code; and
a wireless signal transmitter configured to transmit the door ID code demodulated by the demodulator to the authentication device by use of wireless communication,
the authentication device comprising:
a wireless signal receiver configured to receive the door ID code transmitted from the wireless signal transmitter;
an authentication processor configured for an authentication process to judge whether the received door ID code is legitimate or not; and
an electronic key controller connected to the door, and adapted, when the received door ID code is judged to be legitimate in the authentication process at the authentication processor, to generate, and send to the door, an unlock command, and
the door comprising:
an electronic key configured to unlock with the unlock command received from the electronic key controller.

2. The entry control system as claimed in claim 1, wherein
the mobile terminal comprises a terminal ID code memory configured to store therein a terminal ID code assigned as unique information to the mobile terminal,
the wireless signal transmitter of the mobile terminal is configured to transmit the terminal ID code stored in the terminal ID code memory together with the door ID code to the authentication device,
the wireless signal receiver of the authentication device is configured to receive the terminal ID code together with the door ID code,
the authentication processor of the authentication device is configured for an authentication process to judge whether the door ID code and the terminal ID code are legitimate or not, and
the electronic key controller of the authentication device is adapted, when the door ID code and the terminal ID code are judged to be legitimate, to generate, and send to the door, the unlock command.

3. The entry control system as claimed in claim 1, wherein
the mobile terminal comprises a user ID code memory configured to store therein a user ID code for identification of the user,
the wireless signal transmitter of the mobile terminal is configured to transmit the user ID code stored in the user ID code memory together with the door ID code to the authentication device,
the wireless signal receiver of the authentication device is configured to receive the user ID code together with the door ID code,
the authentication processor of the authentication device is configured for an authentication process to judge whether the door ID code and the user identification data are legitimate or not, and
the electronic key controller of the authentication device is adapted, when the door ID code and the user ID code are judged to be legitimate, to generate, and send to the door, the unlock command.

4. The entry control system as claimed in any one of claims 1 to 3, wherein
the illuminating device comprises:
a timer configured for measurement of time; and
an updater configured to update the door ID code stored in the door ID code memory at intervals of a preset period depending on information on the measurement of time by the timer, and
the authentication device comprises:
an another light-receiving device configured to receive the modulated visible light signal emitted from the light-emitting device;
an another demodulator configured to demodulate the modulated visible light signal received by the another light-receiving device to the door ID code; and
a data collator configured for collation to judge whether or not the door ID code received by the wireless signal receiver from the mobile terminal and the door ID code demodulated by the another demodulator are coincident with each other, and under a judgment that they are coincident with each other, to output the coincident door ID code to the authentication processor.

5. The entry control system as claimed in any one of claims 1 to 3, wherein
the illuminating device and the authentication device are connected through a network to a controlling device,
the illuminating device comprises a first network interface configured for transmission and reception of data to and from the controlling device through the network,
the authentication device comprises a second network interface configured for transmission and reception of data to and from the controlling device through the network, and an authentication data memory configured to store therein an authentication data for use in authentication of a legitimate door ID code at the authentication processor, and
the controlling device comprises a data controller configured to transmit information for an update of the door ID code stored in the door ID code memory through the network and the first network interface, and to transmit information for an update of the authentication data stored in the authentication data memory through the network and the second network interface.

6. An entry control method comprising:
a door ID code storing step of storing, at a an illuminating device configured to illuminate a preset illumination range, storing a door ID code assigned to a door for a facility controlled of entry, as a unique ID code for use to unlock the door;
a light modulation signal generating step of generating, at the illuminating device, a light modulation signal by using the door ID code stored at the door ID code storing step;
a modulated visible light signal emitting step of switching, at the illuminating device, a light-emitting device ON/OFF by using the light modulation signal generated at the light modulation signal generating step to constantly emit a modulated visible light signal, into the illumination range;
a modulated visible light signal receiving step of receiving, at a mobile terminal configured to be portable by a user and when the terminal enters into the illumination range, the modulated visible light signal transmitted at the modulated visible light signal emitting step;
a modulated visible light signal demodulating step of demodulating, at the mobile terminal, the modulated visible light signal received at the modulated visible light signal receiving step to the door ID code;
a door ID code transmitting step of transmitting, at the mobile terminal, the door ID code demodulated at the modulated visible light signal demodulating step to an authentication device, by use of wireless communication;
a door ID code receiving step of receiving, at the authentication device, the door ID code transmitted at the door ID code transmitting step;
a door ID code judging step of judging, at the authentication device, whether or not the door ID code received at the door ID code receiving step is legitimate;
an unlock command sending step of generating and sending to the door, at the authentication device, an unlock command when the door ID code received at the door ID code receiving step is judged to be legitimate; and
an unlocking step of unlocking, at the door, an electronic key, when the unlock command sent at the unlock command sending step is received.

7. The entry control method as claimed in claim 6, comprising:
a terminal ID code storing step of storing, at the mobile terminal, a terminal ID code assigned as unique information to the mobile terminal into a terminal ID code memory;
the door ID code transmitting step comprising transmitting the terminal ID code stored in the terminal ID code memory together with the door ID code to the authentication device;
the door ID code receiving step comprising receiving the terminal ID code together with the door ID code;
the door ID code judging step comprising judging whether the door ID code and the terminal ID code are legitimate or not; and
the unlock command sending step comprising generating, and sending to the door, the unlock command when the door ID code and the terminal ID code are judged to be legitimate at the door ID code judging step.

8. The entry control method as claimed in claim 6, comprising:
a user ID code storing step of storing, at the mobile terminal, a user ID code as information for identification of the user,
the door ID code transmitting step comprising transmitting the user ID code together with the door ID code to the authentication device;

the door ID code receiving step comprising receiving the user ID code together with the door ID code;

the door ID code judging step comprising judging whether the door ID code and the user ID code are legitimate or not; and the unlock command sending step comprising generating, and sending to the door, the unlock command when the door ID code and the user ID code are judged to be legitimate.

9. The entry control method as claimed in any one of claims 6 to 8, comprising:

a time measurement step of making a time measurement at the illuminating device;

an updating step of updating, at the illuminating device, the door ID code stored at the door ID code storing step at intervals of a preset period depending on information on the time measurement made at the time measurement step;

an another modulated visible light signal receiving step of receiving, at the authentication device, the modulated visible light signal transmitted at the modulated visible light signal transmitting step;

an another modulated visible light signal demodulating step of demodulating, at the authentication device, the modulated visible light signal received at the another modulated visible light signal receiving step to the door ID code; and a collating step of collating, at the authentication device, the door ID code received at the door ID code receiving step and the door ID code demodulated at the another modulated visible light signal demodulating step, judging whether or not they are coincident with each other, and under a judgment that they are coincident, allowing a transition to the door ID code judging step.

10. The entry control method as claimed in any one of claims 6 to 8, wherein the illuminating device and the authentication device are connected through a network to a controlling device, and the method comprises:

an authentication data storing step of storing, at the illuminating device, an authentication data for use in authentication of a legitimate door ID code at the door ID code judging step;

an update data transmitting step of transmitting, at the controlling device, information for an update of the door ID code stored at the door ID code storing step to the illuminating device, and information for an update of the authentication data stored in the authentication data storing step to the authentication device, as necessary;

a first receiving step of receiving, at the illuminating device, the information for the update of the door ID code through the network; and another receiving step of receiving, at the authentication device, the information for the update of the authentication data through the network.

* * * * *